United States Patent
Shet et al.

(10) Patent No.: US 8,903,128 B2
(45) Date of Patent: Dec. 2, 2014

(54) OBJECT RECOGNITION FOR SECURITY SCREENING AND LONG RANGE VIDEO SURVEILLANCE

(75) Inventors: Vinay Damodar Shet, Princeton, NJ (US); Claus Bahlmann, Princeton, NJ (US); Maneesh Kumar Singh, Lawrenceville, NJ (US)

(73) Assignee: Siemens Aktiengesellschaft, Munich (DE)

( * ) Notice: Subject to any disclaimer, the term of this patent is extended or adjusted under 35 U.S.C. 154(b) by 437 days.

(21) Appl. No.: 13/397,924

(22) Filed: Feb. 16, 2012

(65) Prior Publication Data

US 2012/0243741 A1    Sep. 27, 2012

Related U.S. Application Data

(60) Provisional application No. 61/443,448, filed on Feb. 16, 2011, provisional application No. 61/443,296, filed on Feb. 16, 2011.

(51) Int. Cl.
*G06K 9/00* (2006.01)
*G06K 9/62* (2006.01)

(52) U.S. Cl.
CPC .......... *G06K 9/6296* (2013.01); *G06K 2209/09* (2013.01)
USPC ....................................................... 382/103

(58) Field of Classification Search
None
See application file for complete search history.

(56) References Cited

U.S. PATENT DOCUMENTS

| | | | |
|---|---|---|---|
| 6,687,404 B1 * | 2/2004 | Hull et al. | 382/226 |
| 6,754,380 B1 * | 6/2004 | Suzuki et al. | 382/156 |
| 8,140,323 B2 * | 3/2012 | Johnson et al. | 704/9 |
| 8,213,672 B2 * | 7/2012 | Daly et al. | 382/100 |
| 2005/0049852 A1 * | 3/2005 | Chao | 704/9 |
| 2005/0230604 A1 * | 10/2005 | Rowe et al. | 250/221 |
| 2006/0062451 A1 * | 3/2006 | Li et al. | 382/159 |
| 2007/0063848 A1 * | 3/2007 | Weisman | 340/573.1 |
| 2009/0016599 A1 | 1/2009 | Cobb | |
| 2009/0153661 A1 | 6/2009 | Cheng et al. | |
| 2009/0229160 A1 * | 9/2009 | Elliott et al. | 42/73 |
| 2010/0008540 A1 * | 1/2010 | Shet et al. | 382/103 |
| 2010/0278420 A1 * | 11/2010 | Shet et al. | 382/156 |
| 2012/0243741 A1 * | 9/2012 | Shet et al. | 382/103 |
| 2014/0172417 A1 * | 6/2014 | Monk et al. | 704/9 |

OTHER PUBLICATIONS

Seunghan et al., "Subjective Logic Based Hybrid Approach to Conditional Evidence Fusion for Forensic Visual Surveillance", Advanced Video and Signal Based Surveillance (AVSS), 2010 Seventh IEEE Int'l Conf, Aug. 29, 2010, pp. 337-344.
International Search Report dated Jun. 28, 2012.

(Continued)

*Primary Examiner* — Tahmina Ansari

(57) ABSTRACT

A method of detecting an object in image data that is deemed to be a threat includes annotating sections of at least one training image to indicate whether each section is a component of the object, encoding a pattern grammar describing the object using a plurality of first order logic based predicate rules, training distinct component detectors to each identify a corresponding one of the components based on the annotated training images, processing image data with the component detectors to identify at least one of the components, and executing the rules to detect the object based on the identified components.

20 Claims, 13 Drawing Sheets

(56) References Cited

OTHER PUBLICATIONS

A system for traffic sign detection, tracking and recognition using color, shape and motion information; Bahlmann et al., IEEE Intelligent Vehicles Symposium (IV 2005), Las Vegas, NV, Jun. 2005.

Predicate Logic Based Image Grammars for Complex Pattern Recognitiono; Shet al., Int'l Journal of Computer Vision, 2011.

In a blink of an eye and a switch of a transistor: cortically-coupled computer vision; Sajda et al., Journal of Latex Class Files, vol. 6, No. 1, Jan. 2007.

Overview of Deployed EDS Technologies; Martz Jr. et al., Lawrence Livermore National Library Technical Report LLNL-TR-417232, Sep. 2009.

Bilattice Based Logical Reasoning for Human Detection; Shet et al., IEEE Int'l Conf. on Computer Vision and Pattern Recognition, 2007.

Multivalued Default Logic for Identity Maintenance in visual Surveillance; Shet et al., 9th European Conference on Computer Vision (ECCV), 2006, Graz, Austria.

Top-down, bottom-up multivalued default reasoning for identity maintenance; Shet et al., 4th ACM Intl' Workshop Video Surveillance & Sensor Networks, 2006.

VidMAP: Video Monitoring of Activing with Prolog; Shet et al., IEEE Int'l Conf. on Advanced Video and Signal Based Surveillance, Como, Italy, Sep. 2005.

Duda R. O. et al; "Pattern Classification"; Jhon Wiley & Sons; Second Edition; pp. 476-486, ISBN: 978-0-471-05669-0, 680 pages, Nov. 2001.

\* cited by examiner

FIG. 8

$\phi($ knife $(X,Y,S) \leftarrow$ blade $(X,Y,S),$
$\qquad sceneconsistent(X,Y,S)) = (\alpha_1, \beta_1)$
$\phi($ knife $(X,Y,S) \leftarrow not(guard(X,Y,S),$
$\qquad guard\_occluded(X,Y,S,X_0,Y_0,S_0),$
$\qquad$ knife $(X_0,Y_0,S_0),$
$\qquad Y_0 > Y) = (\alpha_2, \beta_2).$
$\phi(\neg$ knife $(X,Y,S) \leftarrow not(ongroundplane(X,Y,S))) = (\alpha_3, \beta_3)$
$\phi(\neg$ knife $(X,Y,S) \leftarrow not($ knife$(X,Y,S))) = (\alpha_4, \beta_4)$

OBJECT RECOGNITION FOR SECURITY SCREENING AND LONG RANGE VIDEO SURVEILLANCE

CROSS-REFERENCE TO RELATED APPLICATIONS

This application claims priority to U.S. Provisional Application No. 61/443,448 filed on Feb. 16, 2011, and U.S. Provisional Application No. 61/443,296 filed on Feb. 16, 2011, the disclosure of each is incorporated by reference herein.

BACKGROUND OF THE INVENTION

1. Technical Field

The present disclosure relates generally to computer vision, and more particularly, to security screening and long range video surveillance using computer vision.

2. Discussion of Related Art

Security screening systems inspect checked and hand baggage, cargo, containers, passengers, etc. for content, such as, explosives, improvised explosive devices (IEDs), firearms, contraband, drugs, etc. They play a key role in the Homeland Defense/Security strategy for increased safety in airports, air and sea traffic. For instance, since August 2010 the government has mandated 100% air cargo screening, with possible extension to sea cargo. State-of-the-art security screening systems require improvement in a number of aspects. This includes (a) efficient and effective automation for improved throughput and focused operator attention and (b) a systems view and integration of various components in screening, e.g., reconstruction, segmentation, detection, recognition, visualization, standards, platform, etc., to achieve an efficient screening workflow.

A current system for security screening involves two stages. In a first, automated, stage, X-Ray, CT, etc. scan data is obtained and image reconstruction is performed. Resulting images often encode material properties, such as, density or effective atomic number $Z_{eff}$. Then, pixels or voxels of suspicious density and $Z_{eff}$ are identified, and contiguous regions segmented. Statistics of suspicious regions (e.g., mass, volume, etc.) are computed and compared to critical thresholds. In a second stage, identified suspicious regions are manually verified for occurrence of a threat by the human operator. This strategy is employed in many screening systems developed by various scanner vendors. However, these systems require a large amount of operator supervision, due to the large number of false alarms.

Further, there is an increasing need for fast extraction and review, from real-time and archived surveillance video, of activities involving humans, vehicles, packages or boats. This need has been driven by the rapid expansion of video camera network installations worldwide in response to enhanced site security and safety requirements. The amount of data acquired by such video surveillance devices today far exceeds the operator's capacity to understand its contents and meaningfully search through it. This represents a fundamental bottleneck in the security and safety infrastructure and has prevented video surveillance technology from reaching its full potential.

Automated video analytics modules operating over video surveillance systems provide one means of addressing this problem, by analyzing the contents of the video feed and generating a description of interesting events transpiring in the scene. However, these modules are inadequate to robustly detect human and vehicular activities in video.

SUMMARY OF THE INVENTION

According to an exemplary embodiment of the invention, a method of detecting an object in image data that is deemed to be a threat includes annotating sections of at least one training image to indicate whether each section is a component of the object, encoding a pattern grammar describing the object using a plurality of first order logic based predicate rules, training distinct component detectors to each identify a corresponding one of the components based on the annotated training images, processing image data with the component detectors to identify at least one of the components, and executing the rules to detect the object based on the identified components. The pattern grammar may be implemented as instructions in a processor, where executing of the rules is performed by the processor executing the instructions.

The image data may be output by a security screening device. In at least one embodiment, the training is performed using Adaptive Boosting.

In an embodiment, the threatening object is a knife where the annotated sections indicate whether each component is one of a handle, a guard, or a blade of the knife.

In an embodiment, the threatening object is a gun where the annotated sections indicate whether each component is one of a lock, a stock, or a barrel of the gun.

In an embodiment, the object is a detonator and the annotated sections indicate whether each component is one of a tube and an explosive material.

In an embodiment, the object is a bomb and the annotated sections indicate whether each component is one of a detonator, explosive material, a cable, and a battery.

The image data may be X-ray image data. The image data may be computed tomography (CT) image data.

In an embodiment, training includes determining uncertainty values for each of the rules, converting the rules into a knowledge-based artificial neural network, where each uncertainty value corresponds to a weight of a link in the neural network, and using a back-propagation algorithm modified to allow local gradients over a bilattice specific inference operation to optimize the link weights.

In an embodiment, the pattern grammar describes a visual pattern of the threatening object by encoding knowledge about contextual clues, scene geometry, and visual pattern constraints.

In an embodiment, the training of a corresponding one of the component detectors includes performing a physics-based perturbation on one of the annotated training images to generate a new annotated training image and training the distinct component detectors based on the annotated training images and the new annotated training image.

The perturbation may be a geometric transformation. The performing of the perturbation may include adding another object to be superimposed with a component in the training image to generate the new annotated training image.

According to an exemplary embodiment of the invention, a method of training a threat detector to detect an object in image data that is deemed to be a threat includes defining a pattern grammar to describe a visual pattern that is representative of the object, encoding the pattern grammar using a plurality of first order predicate based logic rules, and dividing an object into component parts, training distinct component detectors to each detect a corresponding one of the component parts, and generating the threat detector from the rules.

According to an exemplary embodiment of the invention, a method of detecting an activity in video data includes annotating sections of at least one training video to indicate whether each section is a component of the activity, encoding a pattern grammar describing the object using a plurality of first order logic based predicate rules, training distinct component detectors to each identify a corresponding one of the components based on the annotated training videos, processing video data with the component detectors to identify at least one of the components, and executing the rules to detect the activity based on the identified components.

BRIEF DESCRIPTION OF THE DRAWINGS

Exemplary embodiments of the invention can be understood in more detail from the following descriptions taken in conjunction with the accompanying drawings in which:

FIG. 8 is an example of rules of a pattern grammar that may be used with the above method.

DETAILED DESCRIPTION

Exemplary embodiments of the invention are discussed in further detail with reference to FIGS. 1-12. This invention may, however, be embodied in different forms and should not be construed as limited to the embodiments set forth herein.

It is to be understood that the systems and methods described herein may be implemented in various forms of hardware, software, firmware, special purpose processors, or a combination thereof. In particular, at least a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures may be implemented in software, the connections between system modules (or the logic flow of method steps) may differ depending upon the manner in which the present invention is programmed. Given the teachings herein, one of ordinary skill in the related art will be able to contemplate these and similar implementations of the present invention.

At least one embodiment of the invention was made in effort to make detection of threatening objects (e.g., guns, knives, explosives, etc.) easier even if they are disguised or separate into their constituent component parts. For example, terrorists use both manufactured and improved firearms. Firearms are even available from some manufacturers disguised as walking-sticks and guns may be manufactured to look like pens, key rings, and many other day-to-day items. Criminals will sometimes saw-off the barrel and butt of a firearm to help make it shorter or more concealable. Handguns not only differ in general shape and size, but can also be constructed from metals, plastics, composite materials, and wood butts or grips. Further, a terrorist may partially dismantle a gun to make the components less recognizable as a firearm. Typically guns will be concealed by terrorists within electrical items; within suitcase linings, to take advantage of metal reinforcing strips and suitcase frames; behind very dense items; or placed at acute angles. A threatening object, such as a firearm can be viewed not as a "gun", but as a set of parts (e.g., "locks, stock, and barrel").

Figure 1:
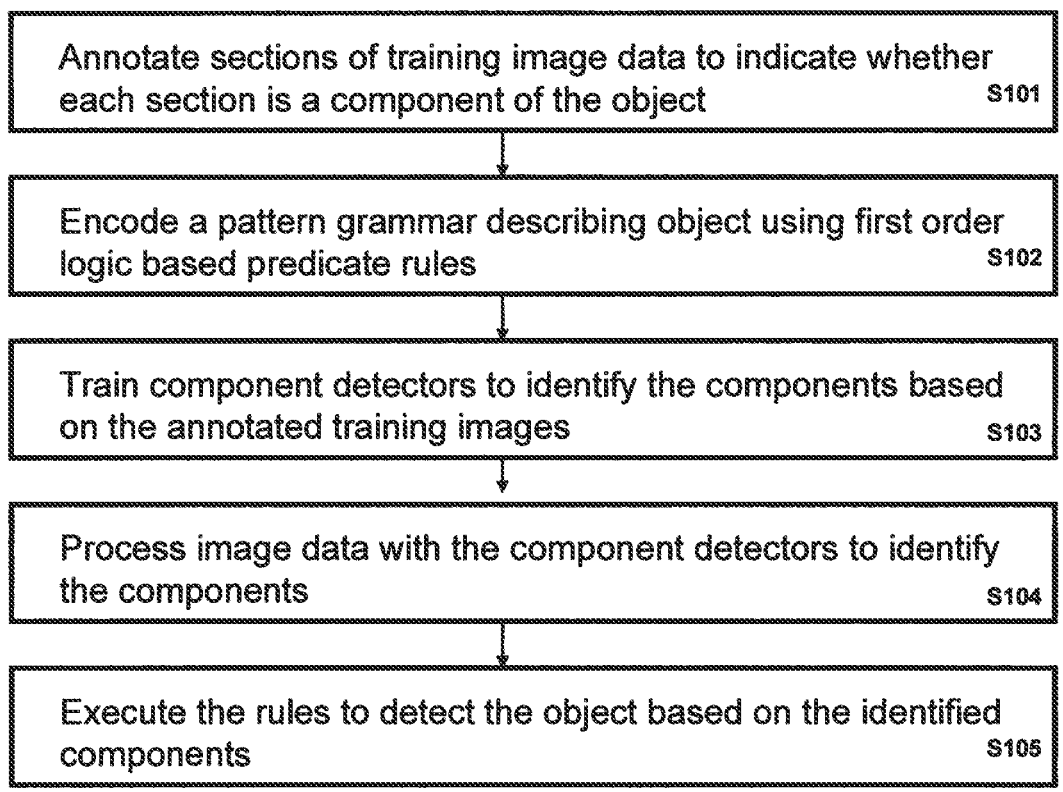
FIG. 1 illustrates a method of detecting an object deemed to be a threat according to an exemplary embodiment of the invention.

FIG. 1 illustrates a method of detecting an object deemed to be a threat according to an exemplary embodiment of the invention. The method includes annotating sections of training image data to identify sections of the image as being at least one of the constituent components of the object (S101).

The annotating step may be skipped if a sufficient repository of annotated training images is already available. The training image data may come from various modalities such as 2D X-ray, 3D Computed Tomography (CT), a millimeter wave scan, backscatter X-ray, etc.

Figure 2A:
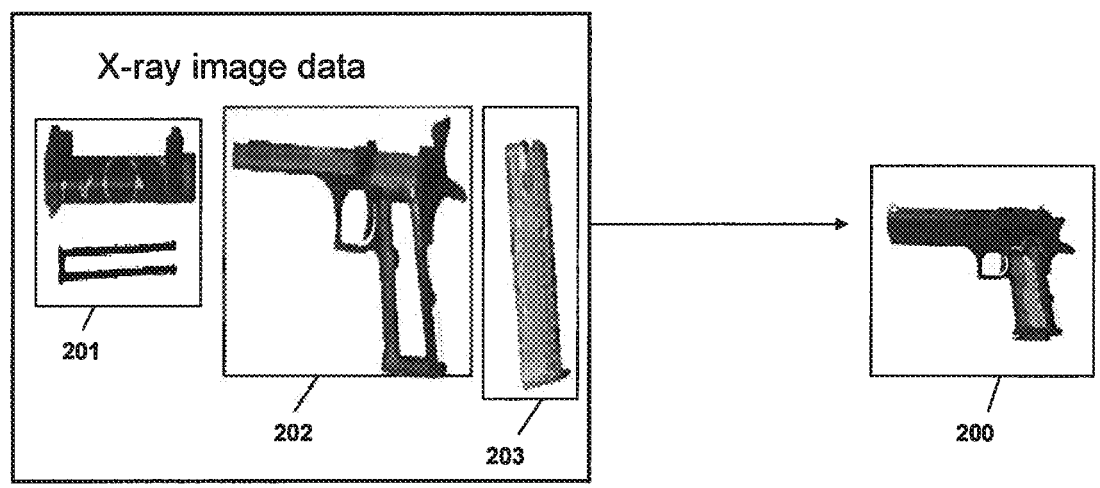
FIGS. 2A and 2B illustrate exemplary components of a threatening object that may be detected by application of the method.
Figure 2B:
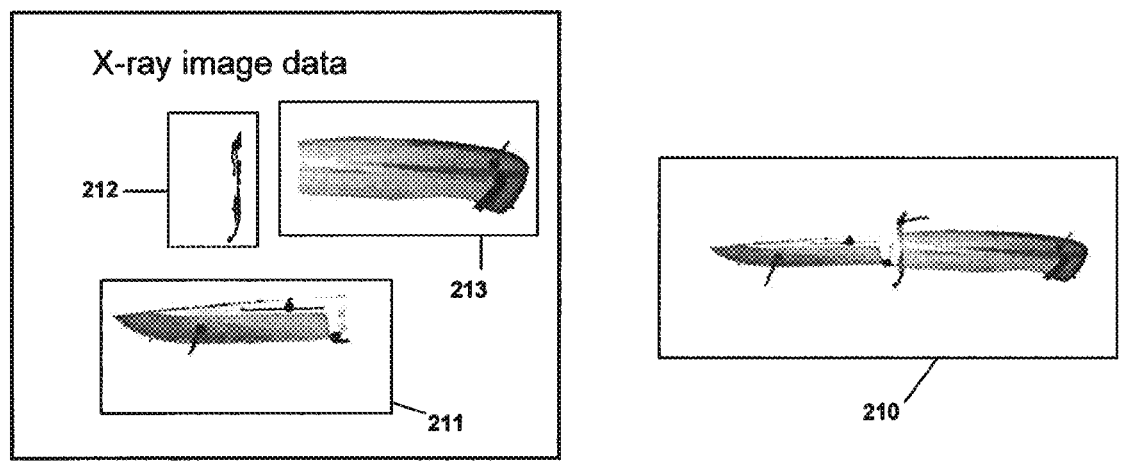
Figure 3:
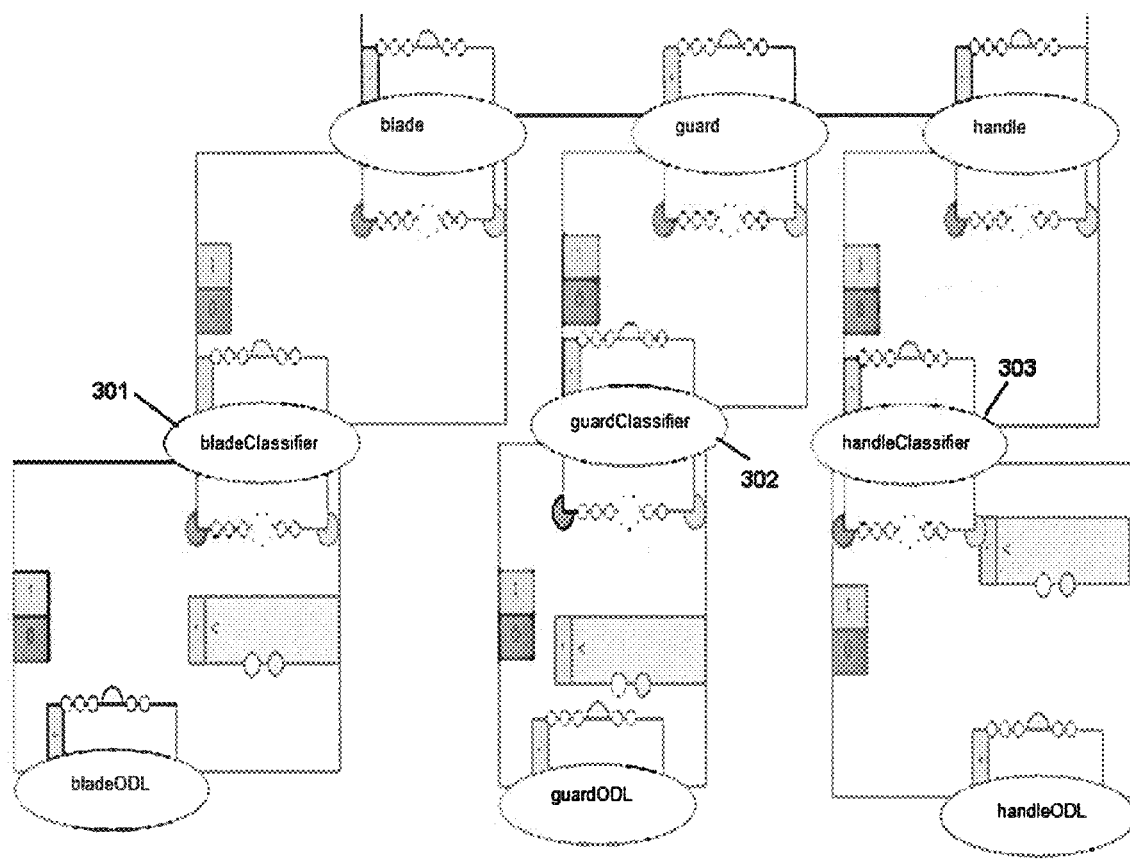
FIG. 3 illustrates exemplary component detector or classifiers that may be used to detect the components.
Figure 4:
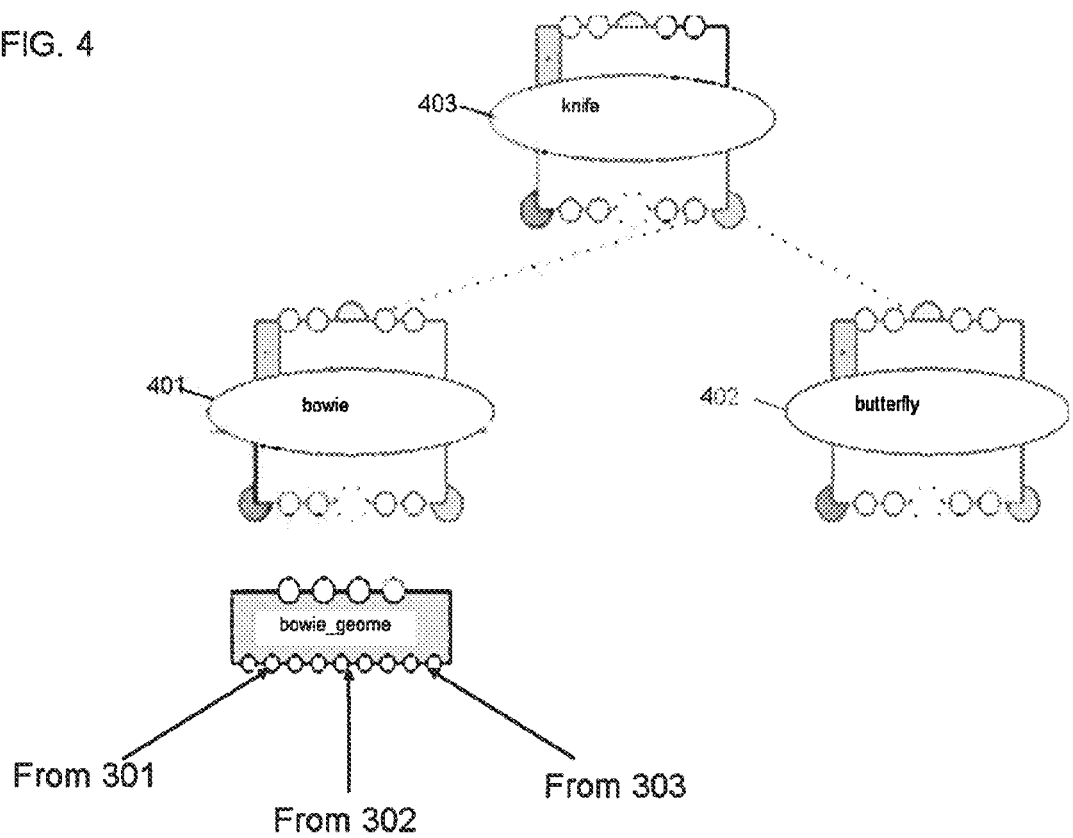
FIG. 4 illustrates additional classifiers that may be used to detect the threatening object using outputs of the component detectors of FIG. 3.

The annotating may be performed manually by a user with experience in detecting the individual components. As shown in FIG. 2A, when the object is a gun 200, the user can annotate (label) the left part 201 as being the barrel, the middle part 202 as being the lock, and the right part 203 as being the stock. As shown in FIG. 2B, when the object is a knife 210, the user can annotate (label) the lower part 211 as the blade, the upper left part 212 as the guard, and the upper right part 213 as the handle. Although not shown in the figures, in other embodiments, the object can be a detonator or a bomb. When the object is a detonator, user can annotate one part as being a tube and another part as being an explosive. In an embodiment, the tube is aluminum and the explosive is lead azide. When the object is a bomb, the user can annotate one part as being the detonator, another part as being the explosive, another part as being a cable (e.g., an electrical cable), and another part as being a battery.

However, embodiments of the invention are not limited the components parts mentioned above or illustrated in FIG. 2A and FIG. 2B. For example, a gun or a knife may include additional parts, and the parts shown may be divided further into sub-parts, for respective annotation. Further, while the disclosure is discussed primarily with respect to knives, guns, and explosive devices, the invention is not limited to any particular type of threatening object. For example, the threatening object can include illicit drug paraphernalia, or other items that are typically disallowed during transport (e.g., air, rail, sea, etc.) such as box cutters, ice picks, scissors, bats, bows, arrows, grenades, screwdriver, hammer, etc. Further, guns as discussed above may include various firearms such as rifles, shotguns, machineguns, etc.

The annotating may consist of marking the component parts with seed points, landmark points, or drawing an outline around each component part. For example, an outline or seed point of a particular color could be used distinguish one component part of the object from another.

Referring back to FIG. 1, the method includes a step of encoding a pattern grammar describing the object using first order logic based predicate rules (S102). The grammar and the rules will be discussed in more detail below.

The method next includes training component detectors to each detect a corresponding one of the components parts from the annotated training image data (S103). In at least one embodiment, the training is performed using Adaptive Boosting (AdaBoost).

For example, as shown in FIG. 2A, when the threatening object is a knife and it is broken into component parts such as a blade, guard, and a handle, the training generates a blade classifier 201, a guard classifier 202, and a handle classifier 203. Had the knife been broken into additional component parts due to the annotation of the training data, additional corresponding classifiers would have been generated. The classifiers may be configured to output binary data (e.g., it's a blade, it's not a blade, it's a guard, it's not a guard, etc.) and a confidence value indicating the level of confidence in the classification.

One or more components parts may be distinctive of a particular type or sub-type of threatening object. For example, one blade may be distinctive of not only a knife, but more particularly of particular type of knife, such as a bowie knife, a butterfly knife, etc. Thus, the components in the training data can be further marked with the type or sub-type. Thus, referring to FIG. 4, classifiers such as a Bowie classifier 401 and a butterfly classifier 402 would be generated, in addition to the overall knife classifier 403. When the sub-type information is unknown, classifiers 401 and 402 can be omitted, and then the output of classifies 301-303 would go directly to the knife classifier 403. In this case, the component 301-303 classifiers receive low level input features and the knife classifier 403 receives component features (e.g., features of blades, guards, etc.) from the component classifiers. Each of the classifiers uses the rules of the pattern grammar to interpret features input to them against the training data to make their respective classifications.

However, the amount of training image data available may be relatively small. Thus, in at least one embodiment of the invention, the available training data is augmented with various perturbation (e.g., physics-based) models with respect to well defined statistics. A perturbation is any one of various geometric transformations that can be performed on the entire object or part of the object. For example, a part of an edge of an object can be rotated, lengthened, shortened, or the width of an area of an object can be increased or decreased. In another example, the entire object could be enlarged, shrunk, rotated, etc. For example, the length of the stock of a shot gun can be shortened to simulate a sawed off shot-gun or the barrel of a gun can be lengthened to simulate different versions of a gun.

Figure 5:
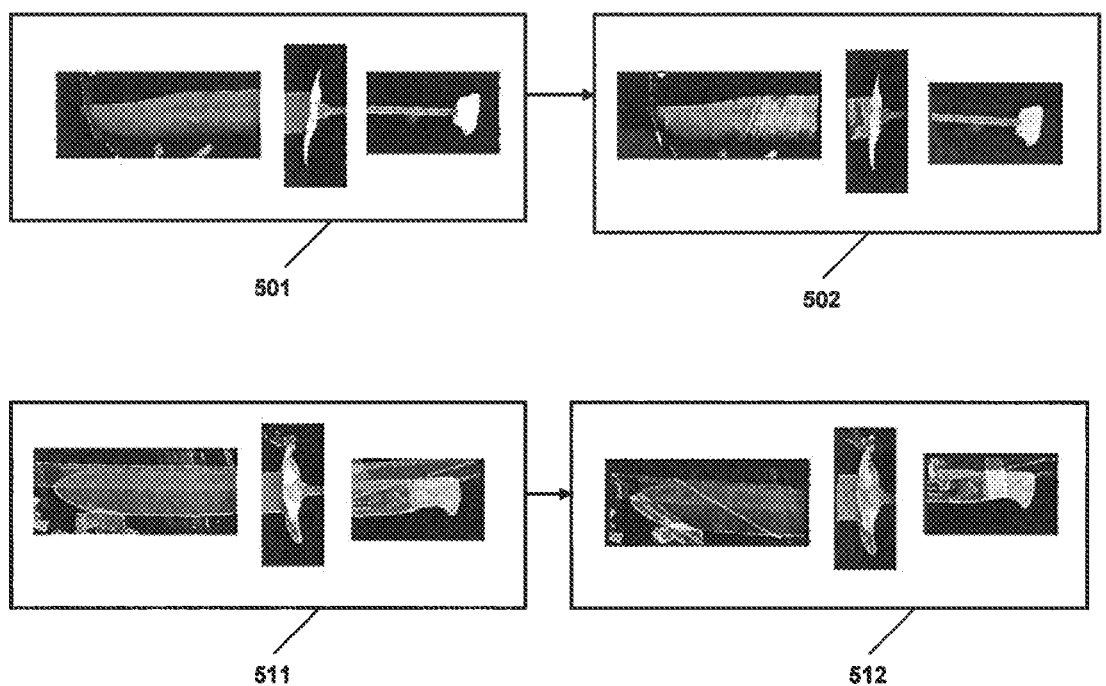
FIG. 5 illustrates exemplary training images that may be created by performing perturbations on training data used to train the component detectors.

FIG. 5 illustrates examples 501→502 and 511→512 of different perturbations, such as geometric transformations being performed on existing training data to generate additional training data. As shown in FIG. 5 these perturbations may include adding artifacts or noise to an existing training image. The additional artifacts can be random objects, noise, or known objects. For example, additional artifacts can be modeled from items typically found in a suitcase, but which with otherwise obscure or interfere with the view provided by the scanner (e.g., a metal pocket watch, a paper clip, etc.). The additional objects added to training data overlap or superimpose at least one component (e.g., the blade) of the threatening object. Based on the type of object, the overlapping may yield different results. For example, if added the object is a material that completely blocks X-rays such as lead, the overlapping portion will appear very dark. If the added object is some other material that does not completely block X-rays, then the overlapping portion may appear somewhat darker or it may be unaffected if X-rays are not obstructed in any way. Due to the above-described perturbations (modifications), additional synthetic images are added to the training data as examples of the threatening object to increase the detection accuracy of a component detector.

Referring back to FIG. 1, the method includes processing image data with the trained component detectors to identify the components of a threatening object (S104). For example, the image data may come from various modalities such as 2D X-ray, 3D Computed Tomography (CT), a millimeter wave scan, backscatter X-ray, etc. For example, assume that the blade classifier 301, guard classifier 302, and handle classifier 303 of FIG. 3 correspond to the trained component detectors and the processing runs each classifier against the image data or against features generated from low level detectors that process the image data. The classifiers/detectors of FIG. 3 may be referred to as data driven classifiers, which may trained for various views. There may be additional classifiers present that identify various shape features (e.g., ridge-like features of the blade) of the threatening object. The shape features and the component based features (e.g., is a blade/is not a blade) can be fed to the knife classifier 403 for classification.

Next, the method of FIG. 1 includes executing the rules to detect the threatening object based on the components identified by the trained component detectors (S105).

Figure 6:
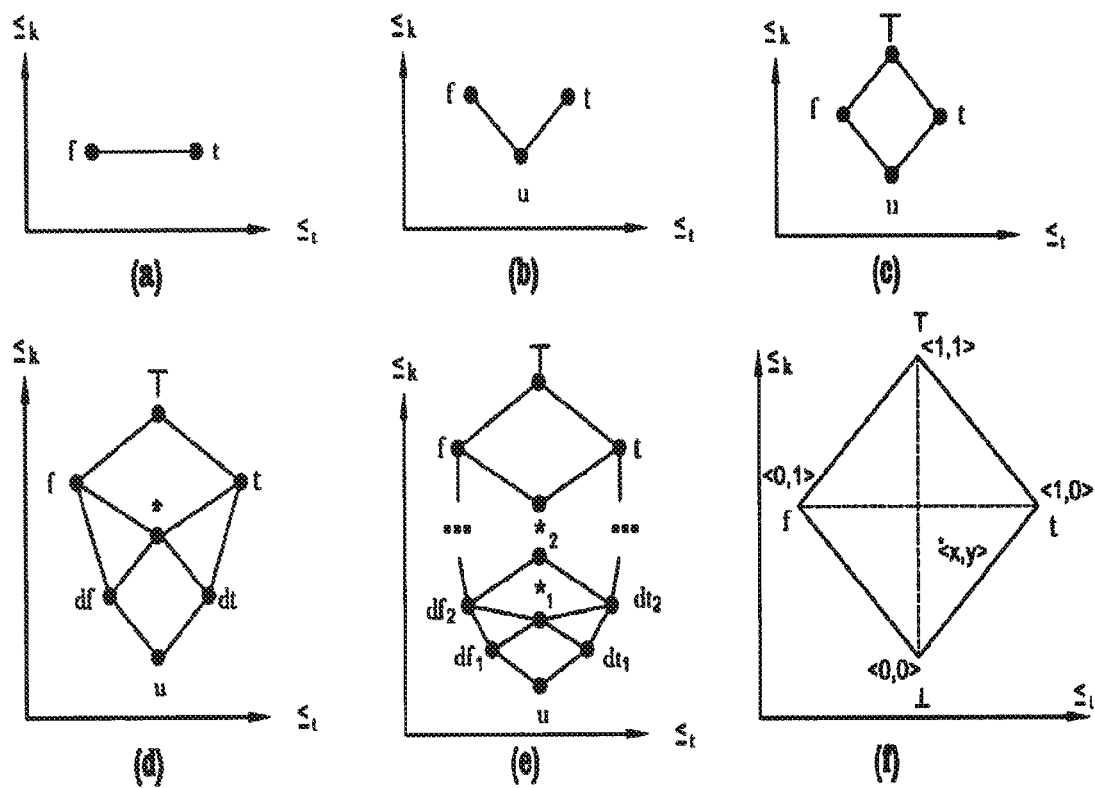
FIGS. 6a, 6b, 6c, 6d, 6e and 6f, shows examples of different bilattices and the types of logic they can be used to model.

In at least one embodiment, the rules can be modeled using bilattice formalism. FIG. 6, which contains FIGS. 6$a$, 6$b$, 6$c$, 6$d$, 6$e$ and 6$f$, shows examples of different bilattices and the types of logic they can be used to model. FIG. 6($a$) for instance, models classical two valued logic, FIG. 6($b$) models three valued logics, FIG. 6($c$) models Belnap's four valued logics, FIGS. 6($d$) and ($e$) model traditional and prioritized default logics, and FIG. 6($f$) models continuous valued logics.

Further to FIG. 6, the choice of different lattices that compose the bilattice give rise to different logics as shown in the figures FIG. 6($a$) bilattice for two valued logics (trivial bilattice) with only true and false nodes, FIG. 6($b$) bilattice for three valued logic with additional node for unknown FIG. 6($c$) bilattice for four valued logics with additional node for contradiction FIG. 6($d$) bilattice for default logics, FIG. 6($e$) bilattice for prioritized default logics and FIG. 6($e$) bilattice for continuous valued logic.

In at least one embodiment, a reasoning system is looked upon as a passive rational agent capable of reasoning under uncertainty. Uncertainties assigned to the rules that guide reasoning, as well as detection uncertainties reported by the low level detectors, are taken from a set structured as a bilattice. These uncertainty measures are ordered along two axes, one along the source's degree of information and the other along the agent's degree of belief. A single rule applied to its set of corresponding facts is referred to as a source here. There can be multiple rules deriving the same proposition (both positive and negative forms of it) and therefore we have multiple sources of information.

A lattice is a set L equipped with a partial ordering ≤ over its elements, a greatest lower bound (glb) and a lowest upper bound (lub) and is denoted as $\wedge = (L, \leq)$ where glb and lub are operations from L×L→L that are idempotent, commutative and associative. Such a lattice is said to be complete, iff for every nonempty subset M of L, there exists a unique lub and glb.

A bilattice is a triple B=(B, ≤t, ≤k), where B is a nonempty set containing at least two elements and (B, ≤t), (B, ≤k) are complete lattices. Informally a bilattice is a set B of uncertainty measures composed of two complete lattices (B, ≤t) and (B, ≤k) each of which is associated with a partial order ≤t and ≤k respectively. The ≤t partial order (agent's degree of belief) indicates how true or false a particular value is, with f being the minimal and t being the maximal while the ≤k partial order indicates how much is known about a particular proposition. The minimal element here is ⊥ (completely unknown) while the maximal element is □ (representing a contradictory state of knowledge where a proposition is both true and false). The glb and the lub operators on the ≤t partial order are ∧ and ∨ and correspond to the usual logical notions of conjunction and disjunction, respectively. The glb and the lub operators on the ≤k partial order are ⊗ and ⊕, respectively, where ⊕ corresponds to the combination of evidence from different sources or lines of reasoning while ⊗ corresponds to the consensus operator. A bilattice is also equipped with a negation operator that inverts the sense of the ≤t partial order while leaving the ≤k partial order intact and a conflation operator—which inverts the sense of the ≤k partial order while leaving the ≤t partial order intact.

The intuition is that every piece of knowledge, be it a rule or an observation from the real world, provides different degrees of information. An agent that has to reason about the state of the world based on this input, will have to translate the source's degree of information, to its own degree of belief. Ideally, the more information a source provides, the more strongly an agent is likely to believe it (e.g., closer to the extremities of the t-axis). The only exception to this rule is when contradictory information is present. For example, when two sources contradict each other, it will cause the agent's degree of belief to decrease despite the increase in information content. It is this decoupling of the sources and the ability of the agent to reason independently along the truth axis that helps us address the issues raised in the previous section. It is noted that the line joining ⊥ and □ represents the line of indifference. If the final uncertainty value associated with a hypothesis lies along this line, it means that the "degree of belief for" and "degree of belief against" cancel each other out and the agent cannot say whether the hypothesis is true or false. Ideally the final uncertainty values should be either f or t, but noise in observations as well as less than completely reliable rules typically prevents such. The horizontal line joining t and f is the line of consistency. For any point along this line, the "degree of belief for" will be equal to "(1-degree of belief against)" and thus the final answer will be consistent.

A rectangular bilattice is a structure Λ⊙P=(L×R, ≤t, ≤k), where for every $x_1, x_2 \in \Lambda$ and $y_1, y_2 \in P$, $(x_1, y_1) \leq_t (x_2, y_2) \Leftrightarrow x_1 \leq_L x_2$ and $y_1 \geq_R y_2$, and $(x_1, y_1) \leq_k (x_2, y_2) \Leftrightarrow x_1 \leq_L x_2$ and $y_1 \geq_R y_2$. An element $(x_1, y_1)$ of the rectangular bilattice Λ⊙P may be interpreted such that $x_1$ represents the amount of belief for some assertion while $y_1$ represents the amount of belief against it. If one denotes the glb and lub operations of complete lattices $\Lambda=(L, \leq_L)$ and $P=(R, \leq_R)$ by $\wedge_L$ and $\vee_L$, respectively, one can define the glb and lub operations along each axis of the bilattice Λ⊙P as follows $$(x_1,y_1) \wedge (x_2,y_2) \Leftrightarrow (x_1 \wedge_L x_2, y_1 \vee_R y_2),$$

$$(x_1,y_1) \vee (x_2,y_2) \Leftrightarrow (x_1 \vee_L x_2, y_1 \wedge_R y_2),$$

$$(x_1,y_1) \otimes (x_2,y_2) \Leftrightarrow (x_1 \wedge_L x_2, y_1 \wedge_R y_2),$$

$$(x_1,y_1) \oplus (x_2,y_2) \Leftrightarrow (x_1 \vee_L x_2, y_1 \vee_R y_2). \quad (1)$$

Figure 7:
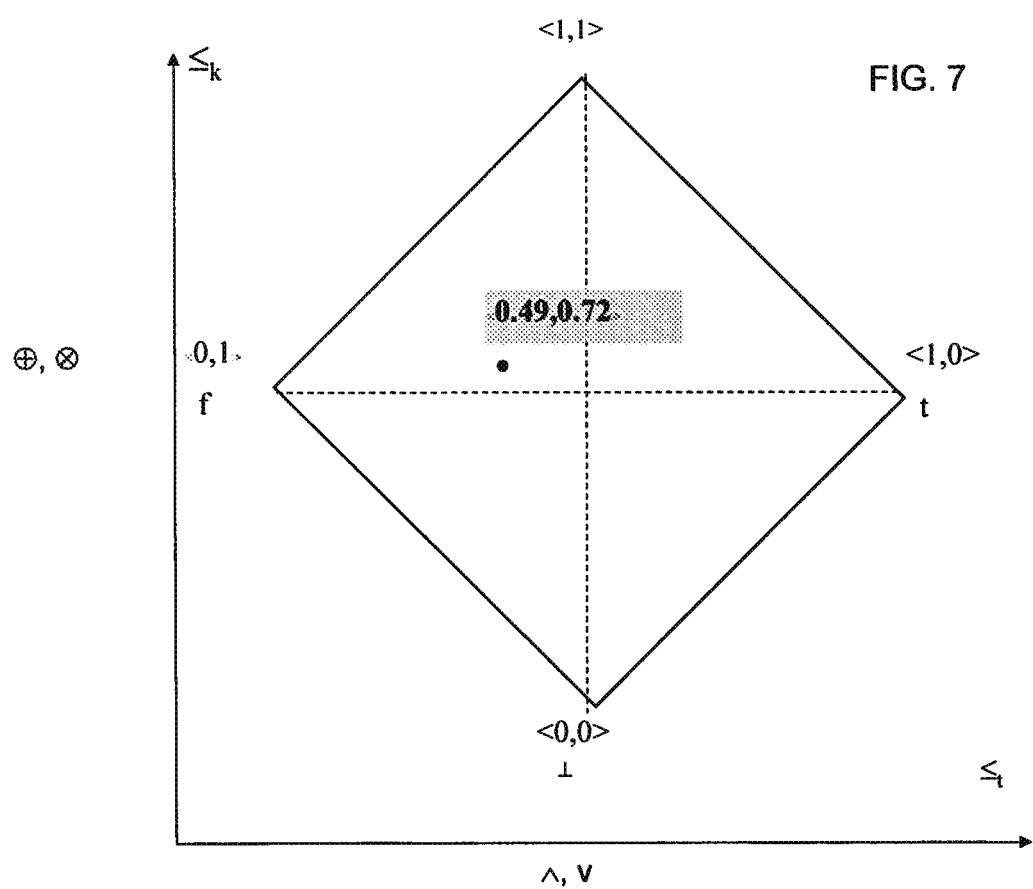
FIG. 7 is an example of a bilatice square.

Of interest to embodiments of the invention is a particular class of rectangular bilattices where Λ and P coincide. These structures are called squares and Λ⊙Λ is abbreviated as $\Lambda^2$. Since detection likelihoods reported by the low level detectors are typically normalized to lie in the [0,1] interval, the underlying lattice that one is interested in is $\Lambda=([0,1], \leq)$. The bilattice that is formed by $\Lambda^2$ is depicted in FIG. 7 with the bilattice square $B=([0,1]^2, \leq_t, \leq_k)$. Every element of this bilattice is of the form evidence_for or, evidence_against. Note that with this choice of the lattice, becomes a complete ordering, meaning all members of the lattice are comparable. The definition of a rectangular bilattice is modified such that $<x_1,y_1> \leq_t <x_2,y_2> \Leftrightarrow x_1-y_1 \leq x_2-y_2$ and $<x_1,y_1> \leq_k <x_2,y_2> \Leftrightarrow x_{1+}y_1 \leq x_{2+}y_2$. Each element in this bilattice is a tuple with the first element encoding evidence for a proposition and the second encoding evidence against. In this bilattice, the element f (false) is denoted by the element <0,1> indicating, no evidence for but full evidence against, similarly element t is denoted by <0,1> element ⊥ by <0,0> indicating no information at all and □ is denoted by <1,1>. To fully define glb and lub operators along both the axes of the bilattice as listed in equation (1), one needs to define the glb and lub operators for the underlying lattice ([0,1], ≤). A popular choice for such operators are triangular-norms and triangular-conorms. The triangular norm may be used to model the glb operator and the triangular conorm may be used to model the lub operator within each lattice.

A mapping $J:[0,1] \times [0,1] \to [0,1]$ is a triangular norm (t-norm) iff J satisfies properties: Symmetry: J(a,b)=J(b,a), $\forall$ a,b∈ [0,1], Associativity: J(a,J(b,c))=J(J(a,b),c), $\forall$ abc∈ [0,1], Monotonicity: J(a,b)≤J(a',b') if a≤a' and b≤b', and One identity: J(a,1)=a, $\forall$ a∈ [0,1]. A mapping $S:[0,1] \times [0,1] \to [0,1]$ is a triangular conorm (t-conorm) iff S satisfies properties: Symmetry: S(a,b)=S(b,a), $\forall$ a,b∈ [0,1], Associativity: S(a,S(b,c)) =S(S(a,b),c), $\forall$ abc∈ [0,1], Monotonicity: S(a,b)≤S(a',b') if a≤a' and b≤b', and Zero identity: S(a,0)=a, $\forall$ a∈ [0,1].

If J is a t-norm, then the equality S(a,b)=1−J(1−a,1−b) defines a t-conorm and one says that S is derived from J. There are number of possible t-norms and t-conorms one can choose. In an embodiment, for the underlying lattice, L=([0, 1], ≤) one chooses the t-norm such that J(a,b)≡a∧ b=ab and consequently chooses the t-conorm as S(a,b)≡a$\vee_L$b=a+b−ab. Based on this, the glb and lub operators for each axis of the bilattice B can then be defined as per equation (1).

Inference in bilattice based reasoning frameworks is performed by computing the closure over the truth assignment. Given a declarative language L, a truth assignment is a function φ: L→B where B is a bilattice on truth values or uncertainty measures. Let K be the knowledge base and φ be a truth assignment, labeling every formula k∈K, then the closure over k∈K, denoted cl(φ) is the truth assignment that labels information entailed by K. For example, if φ labels sentences {p,q←p}∈K as <1,0> (true); i.e. φ(p)=<1,0> and φ(q←p)=<1, 0>, then cl(φ) should also label q as <1,0> as it is information entailed by K. Entailment is denoted by the symbol '□' (K□q).

Let $S_q^+ \subset L$ be the collection of minimal subsets of sentences in K entailing q. For each $U \in S_q^+$, the uncertainty measure to be assigned to the conjunction of elements of U is the term $$\hat{p \in U} cl(\phi)(p) \quad (2),$$

which represents the conjunction of the closure of the elements of U. Recall that ∧ and ∨ are glb and lub operators along the ≤t ordering and ⊗ and ⊕ are operators along ≤k axis. The symbols $\wedge, \vee \otimes, \oplus$ are their infinite counterparts such that $\oplus_{p\in_s} p = p_1 \oplus p_2 \oplus, \ldots$, etc. It is important to note that this term is merely a contribution to the final uncertainty measure of q and not the final uncertainty measure itself. The reason it is merely a contribution is because there could be other sets of sentences in $S_q$ that entail q representing different lines of reasoning (or, in the instant case, different rules and supporting facts). The contributions of these sets of sentences need to be combined using the $\oplus$ operator along the information ($\leq$k) axis. Also, if the expression in equation (2) evaluates to false, then its contribution to the value of q should be <0,0> (unknown) and not <0,1> (false). These arguments suggest that the closure over $\phi$ of q is $$cl(\phi)(q) = \bigoplus_{U \in S_q^+} \bot \vee \left[\bigwedge_{p \in U} cl(\phi)(p)\right] \quad (3)$$

where $\tau$ is <0,0>. This is however, only part of the information. One can also take into account the sets of sentences entailing ¬q. Let $S_q^-$ be collections of minimal subsets in K entailing ¬q. Aggregating information from $S_q^-$ yields the following expression $$cl(\phi)(q) = \bigoplus_{U \in S_q^+} \bot \vee \left[\bigwedge_{p \in U} cl(\phi)(p)\right] \oplus \neg \bigoplus_{U \in S_q^-} \bot \vee \left[\bigwedge_{p \in U} cl(\phi)(p)\right]. \quad (4)$$

Table 1 shows an example, using a simplified logic program, illustrating the process of computing the closure as defined above by combining evidence from three sources. In this example, the final uncertainty value computed is 0.4944, 0.72. This indicates that evidence against the hypothesis at (25, 95) at scale 0.9 exceeds evidence in favor of and, depending on the final threshold for detection, this hypothesis is likely to be rejected. Table 1 illustrates an example showing an inference using closure within a ([0,1]², ≤t, ≤k) bilattice.

TABLE 1

Assume the following set of rules and facts:

| Rules | Facts |
|---|---|
| $\phi$(knife(X, Y, S) ← blade(X, Y, S)) - (0.40, 0.60) | $\phi$(blade(25, 95, 0.9)) - (0.90, 0.10) |
| $\phi$(knife(X, Y, S) ← handle(X, Y, S)) - (0.30, 0.70) | $\phi$(handle (25, 95, 0.9)) - (0.70, 0.30) |
| $\phi$(¬ knife (X, Y, S) ← ¬ scene_consistent(X, Y, S)) = (0.90, 0.10) | $\phi$(¬ scene_consistent(25, 95, 0.9)) = (0.80, 0.20) |

Inference is performed as follow:
el($\phi$)(knife(25, 95, 0.9)) - (0.0) $\vee$ |(0.4, 0.6) $\wedge$ (0.9, 0.1)|$\oplus$(0.0) $\vee$ |(0.3, 0.7) $\wedge$ (0.7, 0.3) |$\oplus_{\neg}$((0, 0) $\vee$ |(0.9, 0.1) $\wedge$ (0.8, 0.2)|) - (0.36, 0) $\oplus$ (0.21, 0) $\oplus_{\neg}$(0.72, 0) - (0.4944, 0) $\oplus$ (0, 0.72) - (0.4944, 0.72)

In addition to using the explanatory ability of logical rules, one can also provide these explanations to the user as justification of why the system believes that a given hypothesis is a threatening object (e.g., a knife, a gun, etc). The system provides a straightforward technique to generate proofs from its inference tree. Since all of the bilattice based reasoning may be encoded as meta-logical rules in a logic programming language, predicates can be added that succeed when the rule fires and propagate character strings through the inference tree up to the root where they are aggregated and displayed. Such proofs can either be dumps of the logic program itself or be English text. In one implementation, the output of the logic program is provided as the proof tree.

A knowledge base can then be defined to detect different patterns of interest. One may start by defining a number of predicates and their associated parameters pertinent to the problem at hand. For instance, for the knife detection problem, atoms such as knife(X,Y,S) (meaning there exists a knife at location (X,Y) and scale S in the image), blade(X,Y,S), guard(X,Y,S), handle(X,Y,S), etc. can be defined. Also defined are relational and geometric predicates such as $(X_1,Y_1, S_1,X_2,Y_2,S_2)$, smaller$(X_1, Y_1,S_1,X_2,Y_2,S_2)$, sceneconsistent (X,Y,S) (meaning the hypothesis at (X,Y) and scale S is consistent with the scene geometry and conforms, within bounds, to the expected size of an object at the location.)

The next step involves specification of the pattern grammar for defining the threatening object, as logical rules, over these defined atoms. Such rules would capture different aspects of the pattern to be recognized such as those shown in FIG. 8, which illustrates a sample subset of rules for knife detection. Rules in such systems can be learnt automatically; however, such approaches are typically computationally very expensive. In one embodiment the rules are manually encoded while automatically learning the uncertainties associated with them.

A desirable property of any reasoning framework is scalability. One may expect scalability in vision systems as different objects or pattern classes are hierarchically composed of constituent patterns that share features like textures, edges etc. and as objects inhabit the same optical world and are imaged by similar optical sensors. Scalability is seen herein as an aspect of the present invention as a design principle wherein the model description is modular, hierarchical and compositional, reflecting the above understanding of the world. The provided framework results in scalable systems if models are appropriately described as such.

With this goal in mind, the following design principle is provided as an aspect of the present invention for object pattern grammar specification. The rule specification is partitioned into three broad categories: object composition model based, object embodiment model based and object context model based.

Rules encoding composition models capture a hierarchical representation of the object pattern as a composition of its constituent part detections. These parts might by themselves be composed of subparts. Rules in this category try to support or refute the presence of a pattern based on the presence or absence of its constituent parts.

Embodiment model rules model knowledge about the object pattern's geometric layout and their embodiment in 3D projective spaces. Context model rules attempt to model the surrounding context within which the pattern of interest is embedded. These rules would for example model interactions between a given object and other objects or other scene structures.

There typically exist multiple rules that derive the same proposition. These multiple rules are interpreted in logic programming as disjunctions (i.e. rule 1 is true or rule 2 is true etc). Wilting rules in this manner makes each rule independently 'vote' for the proposition to be inferred. This disjunctive specification results in a scalable solution where the absence of a single observation does not completely preempt the final output, but merely reduces its final confidence value. As can be seen from the subset of rules in FIG. 8, the inference tree formed would be comprised of conjunctions, disjunctions and different kinds of negations.

The pattern grammar for the threatening object detection problem is formulated as per the broad categories listed in the previous section. Component based rules hypothesize that a threatening object is present at a particular location if one or more of the component part detectors described above detects a component part there. In other words, if a blade is detected at some location, one may say that there exists a knife there. There are positive rules, one each for the blade, guard, handle as well as negative rules that fire in the absence of these detections.

Geometry based rules validate or reject the threatening object (e.g., knife, gun, etc.) hypotheses based on geometric and scene information. This information is entered a priori in the system at setup time. Information is employed about expected length of knives and regions of expected handle locations. The expected image length rule is based on homography information and domain knowledge. For example, fixing a Gaussian at a knife's expected length allows generation of scene consistency likelihoods for a particular hypothesis given its location and size. The expected handle location region is a region demarcated in the image outside of which no valid handle can occur and therefore serves to eliminate false positives.

Context based rules may be present for a system that has to handle occlusions. The idea here is that if the system does not detect a particular threatening object part, then it should be able to explain its absence for the hypothesis to be considered valid. If it fails to explain a threatening object part, then it is construed as evidence against the hypothesis being the object. Absence of threatening object parts may be detected using logic programming's 'negation as failure' operator (not). A valid explanation for a missing threatening object part could either be due to occlusions by static objects or due to occlusions by other objects.

Explaining missed detections due to occlusions by static objects is straightforward. At setup, in one embodiment, all static occlusions are marked. Image boundaries may also be treated as occlusions and marked. For a given hypothesis, the fraction of overlap of the missing threatening object part with the static occlusion is computed and reported as the uncertainty of occlusion. The process is similar for occlusions by other threatening object hypotheses, with the only difference being that, in addition to the degree of occlusion, we also take into account the degree of confidence of the hypothesis that is responsible for the occlusion, as illustrated in the second rule in FIG. 8.

This rule will check to see if knife(X,Y,S)'s guard is occluded by another knife(Xo,Yo,So) under condition that Yo>Y, meaning the occluded knife is behind the 'occlude'. It is important to note that this would induce a scene geometry constrained, hierarchy in the parse graph, since whether or not a given hypothesis is a knife depends on whether or not a hypothesis in front of it was inferred as being a valid pattern of interest. There exist similar rules for other components and also rules deriving a knife in the absence of explanations for missing parts.

A predicate logic based reasoning framework can be efficiently implemented in a logic programming language like Prolog. Distributions of Prolog like SWI-Prolog, allow for the straightforward integration of C++ with an embedded Prolog reasoning engine. Predefined rules can be inserted into the Prolog engine's knowledge base at set up time by the C++ module, along with information about scene geometry and other constraints. At runtime, the C++ module can apply the detectors on the given image, preprocess the feature detector output if needed, syntactically structure this output as logical facts, and finally insert it into the Prolog knowledge base. These detections then serve as initial hypotheses upon which the query can be performed. Since rules contain unbounded variables and observed facts contain constants as parameters, querying for a proposition in Prolog implies finding a suitable binding of the rule variables to the constants of the supporting facts. If no such binding is found, the corresponding rule does not fire.

It is important to note that complexity of general inference in predicate logics can be combinatorial. In practice, however, variable interdependencies between different atoms of a rule restrict the search space significantly. Specifically, in the pattern grammar formulation described herein, there exists significant reuse of the variables between atoms both within and across different rules. Additionally, Prolog can be set up to index facts based on specific variables further reducing complexity of variable binding.

Figure 11:
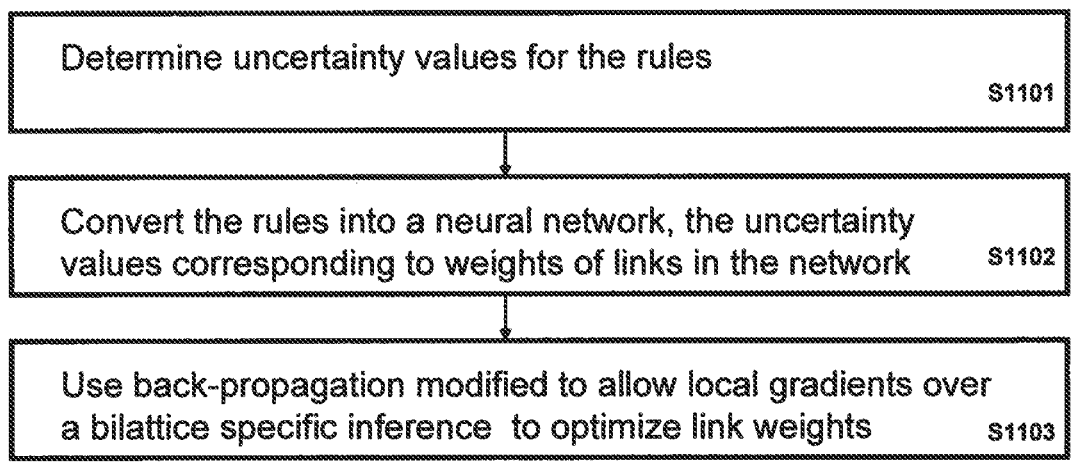
FIG. 11 illustrates a method that may be performed during training of the component detectors according to an exemplary embodiment of the invention.

FIG. 11 illustrates a method that can be used to perform the above-described training of a component detector according to an exemplary embodiment of the invention. Referring to FIG. 11, the method includes determining uncertainty values for the rules (S1101), converting the rules into a neural network where the uncertainty values correspond to weights of links in the network (S1102), and using a back-propagation modified to allow local gradients over a bilattice specific inference to optimize the link weights (S1103).

An instantiated inference tree may be cast from the rules as the neural network (e.g., a knowledge-based neural network). The modified back-propagation is a modified back-propagation algorithm to converge upon a set of rule weights that give optimal performance.

Traditionally, artificial neural networks (ANNs) are modeled as black boxes. Given a set of input and output variables, and training data, a network is created in which the input nodes correspond to the input variables and the output nodes correspond to the output variables. Depending on the nature of the problem to be solved and a priori assumptions, a number of nodes are introduced between the input and output nodes that are termed hidden nodes. Each link connecting two nodes is assigned a link weight. Learning in an ANN implies optimizing link weights to minimize the mean squared error between the network predicted output and ground truth, given input data. In such networks, the intermediate hidden nodes don't necessarily have to be meaningful entities.

In knowledge based ANNs (KBANN), all nodes, hidden or not, have a semantically relevant interpretation. This semantic interpretability arises out of careful construction of the KBANN. In an exemplary embodiment, the KBANN will be constructed from the rules. Each node of the KBANN therefore directly corresponds to each instantiated atom of the rules while links weights correspond to rules weights. Given the rules, optimizing the rule weights is a two step process. Step 1 is to use the rules and facts to create a KBANN and step 2 is to use a modified version of the standard back-propagation algorithm to optimize the link weights of the KBANN, thus in turn optimizing the rule weights in the original rules.

The first step in a learning algorithm according to an exemplary embodiment of the invention is to convert the rules to a representation of a knowledge-based artificial neural network. Consider a set of rules, such as those depicted in FIG. 8. Given a set of training data, in the form of observed logical facts and associated ground truth, the first step is to generate a grounded, propositional, representation for each of the rules. Below is one such set of propositional rule representation.

$$\phi(j \leftarrow o_{11}, o_{12}, o_{13}) = w_{j1}^+$$

$$\phi(j \leftarrow o_{21}, o_{22}, o_{13}) = w_{j2}^+$$

$$\phi(\neg j \leftarrow o_{31}, o_{32}, o_{13}) = w_{j3}^- \quad (5)$$

where each term, j, $o_{11}$, $o_{12}$, etc, represent grounded atoms such as knife (23, 47, 0.4), blade (43, 55, 0.9), etc. The weights associated with these propositional rules correspond to the evidence_for component of the original rules. For a given rule, only the evidence for a component of the uncertainty attached to the rule is relevant. The evidence against component of the rule weight gets discarded during the inference due to the disjunction with <0,0> (see equation (4)). Given a proposition, j, to be reasoned about, positive rules will contribute evidence supporting j, while negative rules will contribute evidence refuting it. The evidence_for component of the negative rule will contribute to the evidence_against component of the proposition to be reasoned about due to the negation (refer to the example in Table 1 for more details). This grounded, propositional, rules representation can now be directly used to construct the artificial neural network. In such a network, observed features (logical facts) become the input nodes, while propositions corresponding to the rule heads become output nodes and are placed at the top of the network. Rule weights become link weights in the network.

Figure 9:
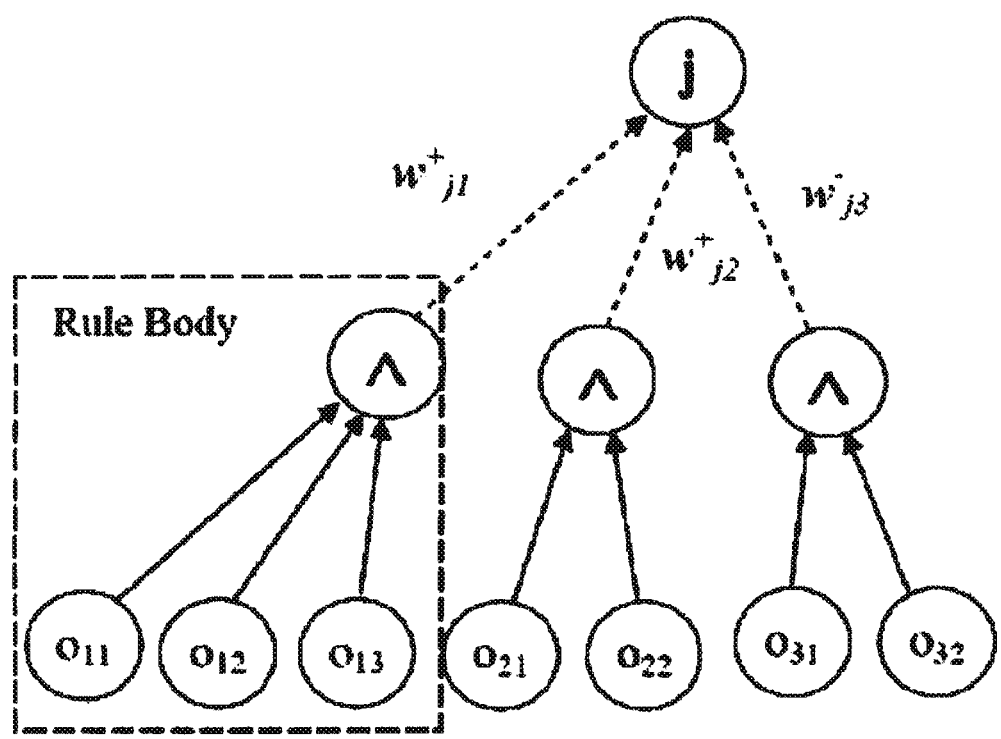
FIGS. 9 and 10 show examples of artificial neural networks.

FIG. 9 shows the KBANN derived from the set of grounded, propositional rules from (5). Conjuncts within a single rule may need to first pass through a conjunction node before reaching the consequent node where along with the weights they would get combined with contributions from other rules in a disjunction. In FIG. 9, the links connecting the conjuncts to the product node are depicted using solid lines. This indicates that this weight is unadjustable and is always set to unity. Only the weights corresponding to the links depicted in dotted lines are adjustable as they correspond to the rule weights.

Figure 10:
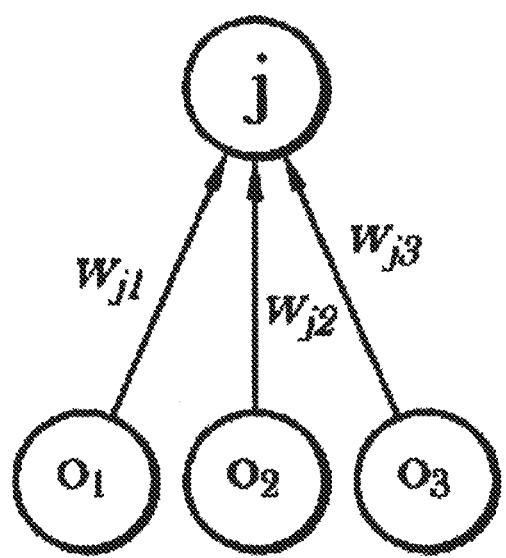

Consider a simple ANN as shown in FIG. 10. In traditional back propagation, the output of an output node is:

$$d_j = \sigma(z_j) = \frac{2}{1 + e^{-\lambda(z_j)}} - 1 \quad (6)$$

where σ is the sigmoid function and where $$z_j = \phi(j) = \sum_i w_{ji} \sigma(\phi(o_i)) \quad (7)$$

The error at the output node is $$E = \frac{1}{2} \sum_j (t_j - d_j)^2 \quad (8)$$

where $t_j$ is the ground truth for node j. Based on this measure of error, the change of a particular link weight is set to be proportional to the rate of change of error with respect to that link weight. Thus $$\Delta w_{ji} \propto -\frac{\partial E}{\partial w_{ji}} \quad (9)$$

Using standard back-propagation calculus, the change in link weight can be computed to be $$\Delta w_{ji} = \eta \delta_j \sigma(\phi(o_j)) \quad (10)$$

where $$\delta_j = (t_j - d_j) \frac{\partial \sigma(z_j)}{\partial z_j} \quad (11)$$

if j is an output node and $$\delta_j = \frac{\partial \sigma(z_j)}{\partial z_j} \sum_{k \in DS(j)} \delta_k w_{lj} \quad (12)$$

if j is a non-output node, where DS(j) is the set of nodes downstream from j.

These equations need to be extended to the KBANN depicted in FIG. 9. This involves computing gradients over the bilattice specific inference operation. Recall that in the bilattice based logical reasoning approach, inference is performed by computing the closure over a logic program using (4). This equation can be simplified as $$z_j = \phi(j) = \bigoplus_i^{+ve} w_{ji}^+ \wedge \left[ \bigwedge_i \phi(o_{il}) \right] \oplus \neg \bigoplus_i^{-ve} w_{ji}^- \wedge \left[ \bigwedge_t \phi(o_{il}) \right] \quad (13)$$

Note that this equation represents a general form of the closure operation before a commitment has been made on the underlying lattice structure and its corresponding glb and lub operators. Once the choice of the underlying lattice and corresponding operators has been made, in conjunction with equations (8), (9) and (13), it should be possible to compute the rate of change of each of the rule weights.

Consistent with earlier description, the underlying lattice will be chosen to be L=([0,1],≤) and the t-norm will be chosen to be J (a,b)≡a∧$_L$b=ab and t-conorm as S(a,b)≡aV$_L$b=a+b−ab. As defined earlier, the glb and lub operators for each axis of the bilattice B can then be defined as per equation (1). Plugging these operator instantiations in equation (13), it can be further simplified to $$z_j = \left( \biguplus_i^{+ve} \right) w_{ji}^+ \prod_l \phi(o_{il}) - \left( \biguplus_i^{+ve} \right) w_{ji}^- \prod_l \phi(o_{il}) \quad (14)$$

where a⊎b=+b−ab.

Note that, unlike the traditional output equation for back propagation equation (7), this formulation is slightly more complex due to the combination of observation nodes via the conjunction (product) node and then further combination of outputs of multiple rules via disjunction (probabilistic sum). The probabilistic sum of weights, can be easily differentiated, with respect to given weight $w_k$ as follows:

$$\underset{i}{\boxed{+}} w_i, \tag{15}$$

$$\frac{\partial \underset{i}{\boxed{+}} w_i}{\partial w_k} = 1 - \underset{i \ne k}{\boxed{+}} w_i$$

Using equation (14) and (15), the gradients can be computed to be $$\frac{\partial E}{\partial w_{ji}^+} = -(t_j - d_j) \left[ \prod_i \phi(o_{il}) \right] \left[ 1 - \underset{m \ne i}{\boxed{+}} w_{jm}^+ \prod_l \phi(o_{ml}) \right] \tag{16}$$

$$\frac{\partial E}{\partial w_{ji}^+} = (t_j - d_j) \left[ \prod_i \phi(o_{il}) \right] \left[ 1 - \underset{m \ne i}{\boxed{+}} w_{jm}^- \prod_l \phi(o_{ml}) \right] \tag{17}$$

The rate of change of each rule weight can be computed as follows:

$$\Delta w_{ji}^+ = \eta \delta_j \left[ \prod_t \phi(o_{il}) \right] \left[ 1 - \underset{k \ne m}{\boxed{+}} w_{jm}^+ \prod_l \phi(o_{ml}) \right] \tag{18}$$

$$\Delta w_{ji}^- = -\eta \delta_j \left[ \prod_t \phi(o_{il}) \right] \left[ 1 - \underset{k \ne m}{\boxed{+}} w_{jm}^- \prod_l \phi(o_{ml}) \right] \tag{18}$$

where $$\delta_j = t_j - d_j \tag{19}$$

if j is an output node and $$\delta_j = \sum_{m \in DS(j)} \delta_m w_{inj} \prod_{i \ne j} \phi(o_{jl}) \left[ 1 - \underset{k \ne j}{\boxed{+}} w_{mk} \prod_l \phi(o_{kl}) \right] \tag{20}$$

if j is a non-output node, where DS(j) is the set of nodes downstream from j.

Once analytically computed the gradient has been analytically computed there are a number of techniques to perform the actual optimization. In one embodiment it has been elected to perform online weight update, where for each data point the gradient is computed and used to instantaneously modify the rule weight. This is in contrast to a batch approach where the cumulative gradient of a batch of data points is used to update the weights. It is believed that an online approach such as the one adopted is better suited for applications with limited access to annotated data.

The reasoning system provides not only a powerful means to detect complex objects, but it can also provide an explanation of why an object is inferred to be a threat. This information can be directly taken from the "parse tree" of the inference. For example, for the pistol threat it can provide the instantiated features of lock, stock, and barrel features, and the predicates that describe how those are connected, combined or put into context. This is valuable information that can enhance a user interface with the human in the loop. A visual interpretation of the parse tree can be presented directly in the image, highlighting the compositional and contextual relation between the low-level components. For example, if a weapon is disassembled, on a press of a button, it can be shown in a configuration suggested by the instantiated set of rules, etc. The detected and segmented parts of a disassembled pistol, explosive threat, etc., can also be animated in a "virtual assembly" for visual verification of the human operator. This provides the user intuitive suggestions to interpret the results from the automated processing.

A further exemplary embodiment of the invention attempts to bridge the gap between the need of designing a robust, automated, video surveillance system, and the capabilities of current low level video analytics modules. This embodiment has the potential to greatly advance intelligence, surveillance and reconnaissance capabilities of an automated surveillance system, thus in turn enhancing homeland security.

Reliably extracting patterns of human or vehicular activities in video can be difficult. Complex visual patterns tend to be compositional and hierarchical. For example, an image of a human can be thought to be composed of a head, torso and limbs. The image of the head is composed of hair and a face. The image of the face is composed of eyes, a nose, a mouth, etc. Such visual patterns tend to be challenging to detect, robustly as a whole, due to high degree of variability in shape, appearance, occlusions, articulation, and image noise among other factors.

An exemplary embodiment of the invention employs automated video surveillance modules that are based on advanced symbolic reasoning that sits on top of the current computer vision technologies. Knowledge of the patterns of human, vehicular, or boat activity is represented in a hierarchical, compositional manner to exploit this knowledge, in conjunction with the output of low level image level features, to effectively search for the presence of the patterns of interest in video.

In an exemplary embodiment of the invention, a first order predicate logic based reasoning framework is mated with the probabilistic output of current image analytics modules. The system described with respect to FIGS. 1-11 can be adapted to detect activities from patterns of interest in video. For example, assume the activity of illegal drug trafficking is associated with video clips of a weapon, bagged items, and certain type of boat. A pattern grammar describing this illegal drug trafficking can then be encoded using a plurality of first order logic based predicate rules. For example, the rules could indicate that drug trafficking is present when the weapon and the bagged items are a certain distance away from the boat. Then a component detector can be trained to identify each component of the drug trafficking, for example, one for detecting the weapon, one for detecting the bagged items, and another for detecting the boat. Then video data can be processed with the component detectors to identify at least one of the components of the drug trafficking, and the rules can be executed to determine whether or not drug trafficking is present. The training of these component detectors can be performed in a manner that is similar to that described above for the components detectors that detect the threatening object.

In addition to activity recognition, such as a reasoning framework can be applied for visual surveillance problems such as detecting of complex objects in aerial imagery, human detection, and identity maintenance.

Robust low level video analytics modules can be designed for tasks like moving object detection, object tracking, human posture and viewpoint estimation, detection of humans carrying packages, and analysis of vehicle trajectories. These modules provide atomic primitives that will serve as input to the high level reasoning, which will then be used to detect complex combinations of human and vehicular activities for security and safety use cases.

The system may facilitate the detection of complex compositional events spread out over time and across multiple cameras.

In an exemplary embodiment of the invention, these modules are integrated with the Siemens' Siveillance™ surveillance platform to develop an end-to-end proof-of-concept system. When combined with Siemens' Siveillance™ video surveillance platforms, such a symbolic reasoning-based human and vehicular activity recognition approach will provide a robust solution to automated visual surveillance, making it possible to rapidly search for interesting activities in stored video or identify activities in real-time. Thus, such a system will greatly enhance situational awareness by providing proactive and predictive capabilities, thus providing advanced Intelligence, Surveillance and Reconnaissance capabilities at any site where it is deployed.

Figure 12:
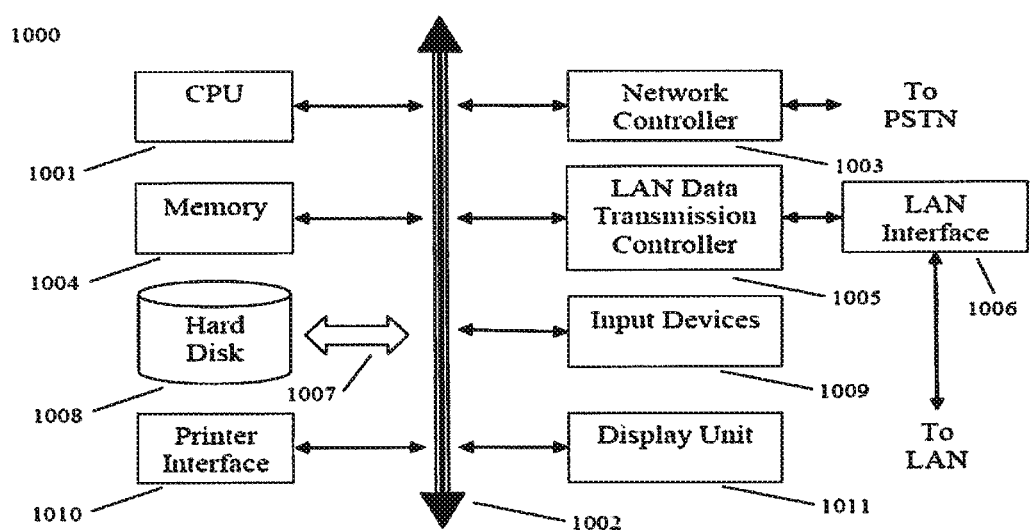
FIG. 12 illustrates an example of a computer system capable of implementing methods and systems according to embodiments of the present invention.

FIG. 12 shows an example of a computer system, which may implement a methods and systems of the present disclosure. The system and methods of the present disclosure, or part of the system and methods, may be implemented in the form of a software application running on a computer system, for example, a mainframe, personal computer (PC), handheld computer, server, etc. For example, the method of FIGS. 1 and 11 may be implemented as software application(s). These software applications may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, a GPU (not shown), a random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. CPU 1001 may be the computer processor that performs some or all of the steps of the methods described above with reference to FIGS. 1-12.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention.

What is claimed is:

1. A method of detecting a weapon in image data, the method comprising:
    annotating sections of a plurality of training images to indicate whether each section is one of a plurality of different constituent parts of a weapon;
    encoding a pattern grammar describing the weapon using a plurality of first order logic based predicate rules;
    training a plurality of distinct component detectors, where each detector is trained to each identify a corresponding one of the weapon parts based on the annotated training images;
    processing image data with the component detectors to identify at least one of the weapon parts; and
    executing the rules to detect the weapon based on the identified weapon parts.

2. The method of claim 1, further comprising:
    generating an explanation that explains why the weapon is considered a threat from a parse tree of the rules; and
    presenting the explanation graphically to a user.

3. The method of claim 1, wherein the explanation includes features in the weapon that were discovered by at least one of the component detectors, and the method further comprises generating an explanation that explains why the weapon is considered a threat from a parse tree of the rules, where the explanation describes how those features are connected to one another.

4. The method of claim 2, wherein the explanation includes a graphical virtual assembly of the weapon from the weapon parts.

5. The method of claim 1, wherein the training of the component detectors is performed using Adaptive Boosting.

6. The method of claim 1, wherein the pattern grammar is implemented as instructions in a processor, and executing of the rules is performed by the processor executing the instructions.

7. The method of claim 1, wherein the weapon is a knife and the annotated sections indicate whether each weapon part is one of a handle, a guard, and a blade of the knife.

8. The method of claim 1, wherein the weapon is a gun and the annotated sections indicate whether each weapon part is one of a lock, a stock, and a barrel of the gun.

9. The method of claim 1, wherein the weapon is a detonator and the annotated sections indicate whether each weapon part is one of a tube and an explosive material.

10. The method of claim 1, wherein the weapon is a bomb and the annotated sections indicate whether each component is one of a detonator, explosive material, a cable, and a battery.

11. The method of claim 1, wherein the image data is X-ray image data.

12. The method of claim 10, wherein the image data is computed tomography (CT) data.

13. The method of claim 1, wherein the training comprises:
    determining uncertainty values for each of the rules;
    converting the rules into a knowledge-based artificial neural network, where each uncertainty value corresponds to a weight of a link in the neural network; and
    using a back-propagation algorithm modified to allow local gradients over a bilattice specific inference operation to optimize the link weights.

14. The method of claim 1, wherein the pattern grammar describes a visual pattern of the weapon by encoding knowledge about contextual clues, scene geometry, and visual pattern constraints.

15. A non-transitory computer readable storage medium embodying instructions executable by a processor to perform method steps for detecting a weapon in image data, the method steps comprising instructions for:
    annotating sections of a plurality of training images to indicate whether each section is one of a plurality of different constituent parts of a weapon;
    encoding a pattern grammar describing the weapon using a plurality of first order logic based predicate rules;
    training a plurality of distinct component detectors, where each detector is trained to each identify a corresponding one of the weapon parts based on the annotated training images;
    processing image data with the component detectors to identify at least one of the weapon parts; and
    executing the rules to detect the weapon based on the identified weapon parts.

16. A method of training a threat detector to detect an object in image data that is deemed to be a threat, the method comprising:
defining a pattern grammar to describe a visual pattern that is representative of the object;
encoding the pattern grammar using a plurality of first order predicate based logic rules; and
dividing an object into component parts;
training distinct component detectors to each detect a corresponding one of the component parts; and
generating the threat detector from the rules,
wherein the training comprises:
superimposing an artifact with one of the component parts in at least one prior training image annotated to indicate that presence of the one component part to generate a new training image; and
training the component detector for detecting the one component part using the prior training images and the new training image.

17. The method of claim 16, wherein the pattern grammar is implemented as instructions in a processor.

18. The method of claim 16, wherein the training comprises: determining uncertainty values for each of the rules; converting the rules into a knowledge-based artificial neural network, where each uncertainty value corresponds to a weight of a link in the neural network; and using a back-propagation algorithm modified to allow local gradients over a bilattice specific inference operation to optimize the link weights.

19. The method of claim 1 further comprises superimposing an artifact with one of the weapon parts in one of the annotated training images to generate a new training image and the training is based on the based on the annotated training images and the new training image.

20. The computer readable storage medium of claim 15, wherein the instructions further comprise instructions for superimposing an artifact with one of the weapon parts in one of the annotated training images to generate a new training image and the training is based on the based on the annotated training images and the new training image.

* * * * *